(12) United States Patent
Peters et al.

(10) Patent No.: US 6,840,710 B2
(45) Date of Patent: Jan. 11, 2005

(54) UNDERGROUND ALLUVIAL WATER STORAGE RESERVOIR AND METHOD

(75) Inventors: Stanley R. Peters, Castle Rock, CO (US); Randall R. Beeson, Arvada, CO (US); Donald O. Summers, Lakewood, CO (US)

(73) Assignee: RAR Group, LLC, Lakewood, CO (US)

( * ) Notice: Subject to any disclaimer, the term of this patent is extended or adjusted under 35 U.S.C. 154(b) by 0 days.

(21) Appl. No.: 10/147,184

(22) Filed: May 15, 2002

(65) Prior Publication Data

US 2002/0172559 A1 Nov. 21, 2002

Related U.S. Application Data

(60) Provisional application No. 60/373,887, filed on Apr. 19, 2002, and provisional application No. 60/290,785, filed on May 15, 2001.

(51) Int. Cl.[7] .............................................. B65G 5/00
(52) U.S. Cl. ...................... 405/57; 405/267; 405/270
(58) Field of Search ........................... 405/52–57, 263, 405/264, 266, 267, 270

(56) References Cited

U.S. PATENT DOCUMENTS

| | | | | |
|---|---|---|---|---|
| 1,159,055 A | * | 11/1915 | Lowe, Sr. .................... 405/55 |
| 1,173,208 A | | 2/1916 | Byram |
| 1,815,722 A | | 7/1931 | Lydon |
| 3,354,656 A | | 11/1967 | Fahnestock |
| 3,645,101 A | * | 2/1972 | Sherard ....................... 405/267 |
| 3,800,544 A | * | 4/1974 | Nakanishi .................. 405/266 |
| 4,180,348 A | | 12/1979 | Taylor |
| 4,222,685 A | | 9/1980 | Jefferson |
| 4,276,164 A | * | 6/1981 | Martone et al. .............. 405/52 |
| 4,326,818 A | | 4/1982 | Willis |
| 4,344,722 A | | 8/1982 | Blais |
| 4,457,646 A | | 7/1984 | Laesch |
| 4,501,788 A | | 2/1985 | Clem |
| 4,637,462 A | * | 1/1987 | Grable ........................ 405/270 |
| 4,651,824 A | * | 3/1987 | Gradle ........................ 210/170 |
| 4,696,607 A | * | 9/1987 | Ressi di Cervia .......... 405/267 |
| 4,902,167 A | | 2/1990 | Shelton |
| 4,919,568 A | | 4/1990 | Hurley |
| 4,986,696 A | | 1/1991 | Pera |
| 4,988,235 A | | 1/1991 | Hurley |
| 5,080,528 A | * | 1/1992 | Ressi di Cervio ............ 405/53 |
| 5,178,491 A | * | 1/1993 | Graves et al. ........... 405/128.3 |
| 5,228,802 A | | 7/1993 | Kuwabara et al. |
| 5,249,887 A | | 10/1993 | Phillips |
| 5,342,144 A | | 8/1994 | McCarthy |
| 5,360,290 A | | 11/1994 | Yamada et al. |
| 5,458,436 A | | 10/1995 | Plowman et al. |
| 5,468,097 A | | 11/1995 | Bernhardt |
| 5,672,028 A | | 9/1997 | Mechta |
| 5,758,991 A | | 6/1998 | Shiosaka |
| 5,827,010 A | | 10/1998 | Hassett |
| 5,885,026 A | | 3/1999 | Hwang |
| 6,000,880 A | | 12/1999 | Halus |

(List continued on next page.)

*Primary Examiner*—Frederick L. Lagman
(74) *Attorney, Agent, or Firm*—Merchant & Gould, P.C.

(57) ABSTRACT

An underground reservoir for storing water in alluvial deposits utilizes slurry walls keyed to an aquiclude beneath the reservoir to form a substantially impermeable water seal. A variety of water extraction/recharge apparatus provides for rapid and complete filling and draining of the underground reservoir. Such apparatus includes a plurality of wells distributed about the underground reservoir and a series of perforated pipes buried at a predetermined depth within the underground reservoir. A method of mitigating water table fluctuations resulting from the construction of an underground utilizes perforated pipes buried outside of the reservoir to transfer excess water from an uphill land parcel to a downhill land parcel that would otherwise experience a water shortage after construction of the underground reservoir.

21 Claims, 7 Drawing Sheets

U.S. PATENT DOCUMENTS

| | | |
|---|---|---|
| 6,041,738 A | 3/2000 | Hemauer et al. |
| 6,095,718 A | 8/2000 | Bohnhoff |
| 6,102,618 A | 8/2000 | Takada et al. |
| 6,116,816 A * | 9/2000 | Suthersan et al. ..... 405/128.15 |
| 6,120,210 A | 9/2000 | Hsu |
| 6,139,225 A | 10/2000 | Koike et al. |
| 6,280,118 B1 * | 8/2001 | Suthersan et al. ..... 405/128.45 |

* cited by examiner

UNDERGROUND ALLUVIAL WATER STORAGE RESERVOIR AND METHOD

RELATED APPLICATIONS

This application claims priority of U.S. provisional application Ser. No. 60/290,785, entitled "Underground Alluvial Water Storage Reservoirs," filed May 15, 2001, and U.S. provisional application Ser. No. 60/373,887, entitled "Underground Alluvial Water Storage Reservoirs," filed Apr. 19, 2002.

TECHNICAL FIELD

The invention relates generally to storing water in underground reservoirs and, more particularly, to a method for storing an isolated supply of water in the voids found in alluvial deposits.

BACKGROUND OF THE INVENTION

It is becoming increasingly difficult, both in terms of cost and availability, to construct conventional open reservoirs for the storage of water. Such reservoirs typically require the construction of a dam across a river, thereby flooding vast expanses of land upstream of the dam while severely curtailing the flow of water downstream from the dam. In light of the increasing value of water and the complexities of the various water laws across different jurisdictions, it is becoming prohibitively difficult to form an open reservoir in this manner. Open reservoirs may also be formed by first excavating a large pit and then filling the pit with water, provided that the reservoir is properly lined to isolate the privately owned water from potential commingling with the public domain water in the same general alluvial deposit. Previously, such open reservoirs could be formed by purchasing the rights to abandoned gravel quarries. However, due to the current high demand for water storage, such opportunities are extremely rare. While it is possible to excavate a large pit for the specific purpose of forming an open water reservoir, such a technique requires a great expense of time and money to purchase the land, form the pit and dispose of the excavated material and soil, assuming that the excavated materials have no intrinsic economic value.

One major disadvantage to open reservoirs is that they preempt any current or future use of the land other than to store water. That is, as additional land surface is devoted to the storage of water in open reservoirs that same land surface is unavailable for alternative uses such as farming or open space. A further disadvantage of storing water in open reservoirs is the high degree of evaporative losses experienced by such reservoirs due to relatively large air/water interface. Specifically, in arid climates (such as those found in the Western United States), open reservoirs are subject to extremely large evaporative losses.

A further unfortunate disadvantage to open reservoirs is that the reservoirs are highly susceptible to contamination. While previous concerns have been limited to accidental chemical spills, petroleum leaks, polluted surface-water runoff, and the like, a more immediate threat is that of intentional contamination as part of a terrorist act. Most municipal water reservoirs comprise unfenced bodies of waters in remote areas and are extremely difficult if not impossible to guard. Furthermore, the construction of fences around existing reservoirs would be expensive and time consuming, and even then the open reservoirs would be susceptible to contamination from the air.

One proposed solution to the above-described disadvantages of open reservoirs is the construction of underground reservoirs where water is stored in the voids or interstices found in alluvial deposits. One such method is described in U.S. Pat. No. 4,326,818, issued to Willis and entitled "Techniques for the Storage of Water." The Willis patent describes forming an enclosed flexible wall extending vertically downward toward a natural aquiclude or stone base that is impermeable to water. The wall is formed by a grouting process where a grout pipe is first inserted through the soil until the pipe reaches the aquiclude and is then withdrawn while a grout material is injected under pressure from the end of the pipe. The grout material moves away from the injection zone and fills the pores of the formation where it hardens to form a grout "column." This process is repeated numerous times to form a closed perimeter wall around a defined reservoir boundary. That is, adjacent grout columns are positioned so that there is little or no space between the columns. A second and third round of grout columns are then formed adjacent the first round of columns to form a wall that is said to be substantially impermeable to water. Conventional wells and feed lines are then constructed within the boundary of the grout wall to withdraw and supply water to the reservoir as needed.

The specific reservoir described in the Willis patent suffers from a number of drawbacks. Initially, the grout wall construction technique described by Willis (i.e., pressure-grouting clay or other "flexibilized" materials and allowing the grout to "jel" into place) does not typically form uniform subsurface columns. Rather, the grout material disperses from the end of the grout pipe in an uneven and haphazard manner (i.e., permeating different radial distances away from the grout pipe) as the grout pipe is retracted toward the surface. The uneven nature of the grouting process tends to form vertical sand seams between the grouted columns at the outer boundary of the pressure injection. These sand "lenses" or areas of high permeability formed between adjacent grout "columns" result in grout walls that do not form substantially impermeable water barriers and that are susceptible to relatively high levels of water leakage or seepage. Additionally, it is not possible to key the grouted in-situ "columns" into the bedrock or other impermeable basement rock that defines a bottom surface of the underground reservoir. Rather, a small horizontal layer typically remains between the bottom ends of the various grout columns and the bedrock so that water may escape the reservoir through this gap between the wall and the bedrock, where the hydrostatic pressure is at its greatest level. Indeed, between the inability to form a solid impermeable wall using the grout technique, and the inability to firmly tie the grout columns to the bedrock defining the lower surface of the reservoir, the water leakage rates of a reservoir built according to the technique of the Willis patent would be prohibitively high.

A second drawback to the technique of the Willis patent is the use of conventional wells for charging and extracting water from the underground reservoir. Specifically, such wells are relatively inefficient when it comes to rapidly charging the reservoir with water during periods of surplus water, such as during a Spring runoff. The same wells are similarly inefficient with respect to withdrawing water at a desired high rate during periods when the water level within the reservoir is low. That is, because the typical groundwater flow past the well is prevented within the confines of the subsurface reservoir (and thus the water within the reservoir is not pressurized to the same degree as would be found in a natural aquifer), conventional vertical wells are unsatisfactory when it comes to extracting water at a desired rate from the underground reservoir.

A further problem associated with the underground reservoir described in the Willis patent is that there is no recognition of the problems associated with the construction of the massive subsurface walls. Specifically, the installation of any subsurface wall on the scale of that required to form an underground reservoir tends to form a dam to the normal flow of groundwater so that water levels on the upstream or "high" side of the reservoir wall will tend be higher than historic average levels, while the opposite condition (i.e., lower than average water levels) will be found on the downstream or "low" side of the reservoir. Such artificial changes to the historic water table can have severe adverse impacts on neighbors in the region. For example, neighbors on the high side of a subsurface reservoir may experience flooded basements, while neighbors on the low side will experience a dearth of water such that alluvial wells may run dry.

Thus, while the Willis patent describes one theoretical design for a subsurface reservoir, the specifics of the Willis reservoir are not feasible due both to the inability to form a water-tight reservoir and the further inability to efficiently recharge and extract water from the reservoir. Additionally, the grout wall construction techniques described in the Willis patent are prohibitively expensive (costing $40-$200 per square foot of barrier), particularly when used on the scale required for an underground reservoir. Furthermore, the Willis patent does not account for the environmental impact that will be caused by the construction of the potentially massive subsurface walls. Thus, an improved subsurface reservoir and method for storing water is needed that will address the shortcomings of the Willis design. It is with respect to these and other background considerations, limitations and problems that the present invention has evolved.

SUMMARY OF THE INVENTION

In accordance with the present invention, the above and other problems are solved by an underground reservoir for storing water in alluvial deposits that is formed by a slurry wall extending from a surface level to an aquiclude (e.g., bedrock) beneath the reservoir so that a bottom surface of the slurry wall is keyed into the aquiclude to form a substantially impermeable water seal within the reservoir. Generally, the reservoir includes a plurality of water extraction/recharge means distributed about the interior area of the underground reservoir to provide for rapid and substantially even filling and draining of the underground reservoir. In one embodiment, a plurality of wells may be distributed about the underground reservoir, each well connected to a pump to direct water under pressure through the plurality of wells and into the alluvial deposits of the underground reservoir. Alternatively, a series of perforated pipes may be buried at a predetermined depth within the underground reservoir so that the perforated pipes are connected to a central pressurized well that is operated to recharge and extract water from the alluvial deposits through the perforated pipes.

In one preferred embodiment, the underground reservoir includes a mitigation system to reduce water table fluctuations in land parcels positioned upstream and downstream of the underground reservoir. The mitigation system may include an uphill perforated pipe installed within an upstream land parcel outside of the reservoir at a depth between a historic high and a historic low groundwater level of the upstream land parcel. The mitigation system further includes a downhill perforated pipe installed within a downstream land parcel outside of the reservoir boundary at a depth between a historic high and a historic low groundwater level of the downstream land parcel. The uphill and downhill perforated pipes are then connected by a non-perforated conduit so that excess groundwater that has been dammed against the upstream boundary of the reservoir can be transported through the conduit and the perforated pipes to the downstream land parcel (which would otherwise experience a depressed groundwater level as a result of the damming action caused by the reservoir).

In another embodiment of the present invention, a method for storing water in underground alluvial deposits includes the step of constructing an underground slurry wall to surround the alluvial deposits so that a bottom end of the slurry wall is keyed into an aquiclude running beneath the alluvial deposits, thereby forming a substantially impermeable water seal between the slurry wall and the aquiclude. The method further includes alternately extracting and recharging the underground alluvial deposits with water, such as by constructing a plurality of wells extending downward through the alluvial deposits or such as by burying a series of perforated pipes within the alluvial deposits and connecting the perforated pipes to a central well.

In yet another embodiment of the present invention, a method of mitigating water table fluctuations resulting from the construction of an underground reservoir includes burying an uphill perforated pipe outside of a boundary of the underground reservoir within an upstream land parcel at a depth between a historic high and a historic low groundwater level of the upstream land parcel. The method further includes burying a downhill perforated pipe outside of the boundary of the underground reservoir within a downstream land parcel at a depth between a historic high and a historic low groundwater level of the downstream land parcel. A non-perforated conduit is then connected between the uphill perforated pipe and the downhill perforated pipe to remove excess groundwater from the upstream land parcel and transport the excess groundwater to the downstream land parcel. In one embodiment of the invention, the first uphill perforated pipe is buried at a depth substantially equal to the historic high groundwater level, and a second uphill perforated pipe is buried a depth substantially equal to the historic low groundwater level for the upstream land parcel. The second uphill perforated pipe is then fluidly connected to the downhill perforated pipe, and a valve is positioned between the second uphill perforated pipe and the downhill perforated pipe so that the groundwater level of the upstream land parcel can be varied between the historic high and low groundwater levels.

The great utility of the invention is the ability to create an efficient, cost effective water reservoir without incurring the costs associated with traditional open reservoirs. The underground alluvial reservoir achieves this end through the use of highly impermeable slurry walls to form the boundary of the reservoir, and efficient water extraction/recharge means to ensure that the reservoir can be rapidly recharged during opportune times, such as during a Spring runoff, and to further ensure that water within the reservoir may be extracted even when the water level within the reservoir is low. The underground reservoir of the present invention further mitigates any impact on surrounding land owners relating to the construction of the massive underground slurry walls by utilizing a drain system that allows dammed water on the high side of the reservoir to be transferred to the low side of the reservoir so that land parcels on the high side are not flooded while land parcels on the low side of the reservoir do not experience a dearth of water. These and various other features as well as advantages, which characterize the present invention, will be apparent from a reading of the following detailed description and a review of the associated drawings.

DETAILED DESCRIPTION

Figure 1:
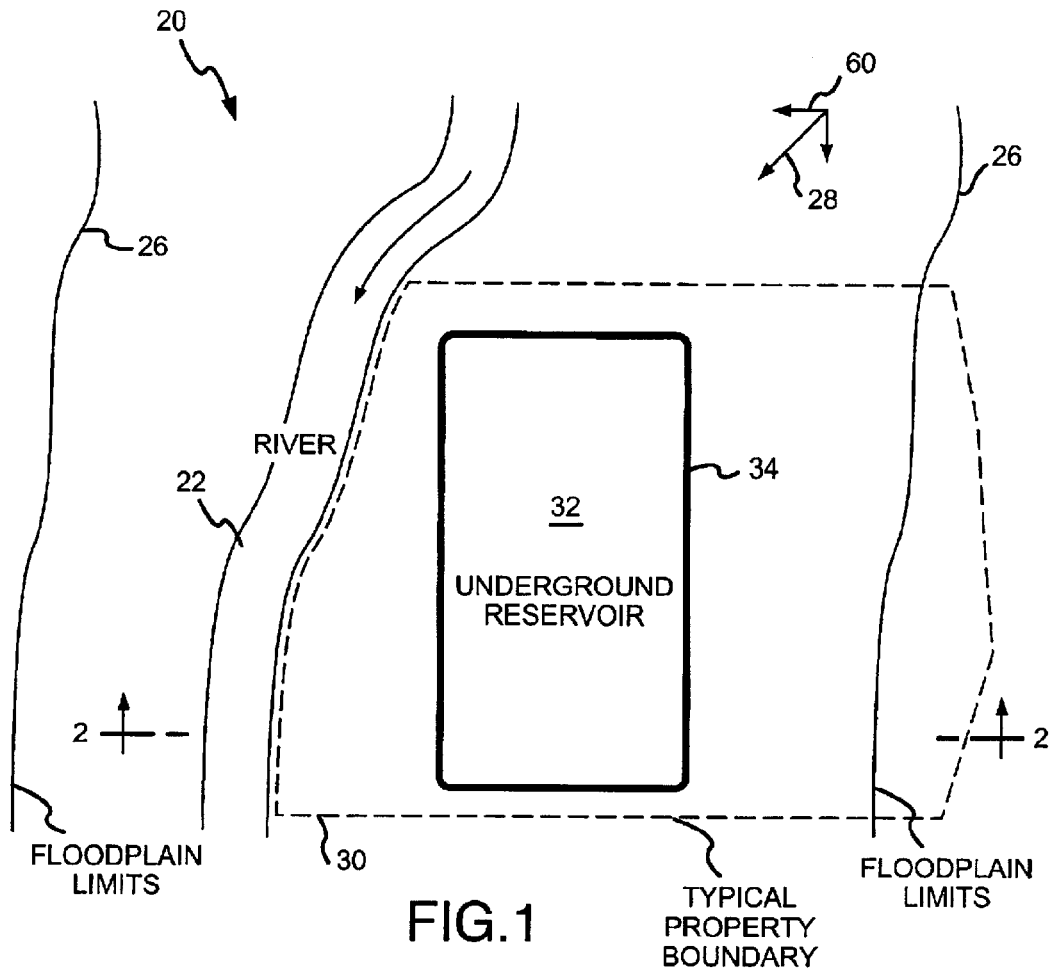
FIG. 1 is a plan view of a typical river basin illustrating a typical property boundary and a perimeter of an underground water reservoir built in accordance with an embodiment of the present invention.
Figure 2:
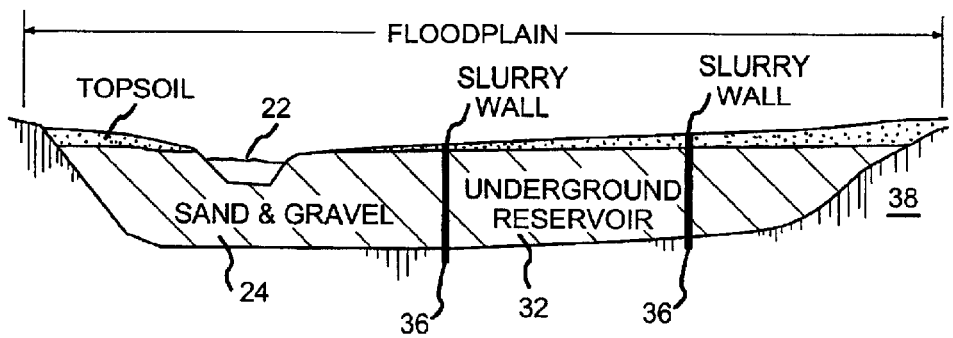
FIG. 2 is a section view of the river basin taken substantially along the line 2—2 in FIG. 1 illustrating the vertical limits of slurry walls used to form the underground water reservoir, where the slurry walls are keyed into a bedrock formation underlying the river basin.

FIGS. 1 and 2 illustrate an exemplary river system or basin 20 comprising a riverbed 22 that flows along the top of alluvial deposits 24 (e.g., sand and gravel) formed within the boundary 26 of a floodplain that extends to either side of the current riverbed 22. An arrow 28 in FIG. 1 illustrates a direction of flow of the groundwater through the alluvial deposits 24. A dashed line 30 further illustrates a typical property line of a parcel of land that abuts the river 22. An underground reservoir 32 is preferably formed with a regular geometric boundary 34, such as the rectangular boundary 34 shown in FIG. 1, so that the entire boundary 34 is contained within the property line 30.

FIG. 2 illustrates a section view of the river basin 20, including the riverbed 22 itself and the lateral and vertical limits of the reservoir 32. FIG. 2 further illustrates that the reservoir 32 is preferably formed by a slurry wall 36 that is keyed into bedrock 38 or a similar aquiclude that extends below the floodplain boundary 26. With respect to impeding groundwater flow, the slurry wall 36 provides a number of benefits over the type of grout or curtain wall described in U.S. Pat. No. 4,326,818 to Willis.

Initially, it is noted that the slurry wall 36 may be formed in a variety of manners and with a variety of materials. The most typical construction technique for forming a slurry wall is a trench technique that involves excavating a narrow trench that is immediately and concurrently filled with a fluid "slurry" that exerts hydraulic pressure against the trench walls to prevent the trench from collapsing as it is formed. While different materials may be used to form the slurry, bentonite clay mixed with water is the preferred slurry for use in constructing the slurry walls 36. This is because the bentonite tends to coat the walls of the trench, thereby preventing the water from being absorbed through the trench walls prior to the formation of the slurry wall 36. Additionally, the bentonite coating helps to enhance (i.e., reduce) the final permeability of the slurry wall 36.

Slurry wall trenches may be several feet wide and can be dug in excess of 100 feet deep with the use of specialty excavation equipment. Shallower trenches may be formed with conventional backhoes. It is important to remember that the trench must extend down so that it is "keyed" into the bedrock 38 or other confining layer (such as clay) that runs below the alluvial deposits 24. In one preferred embodiment, the trench is keyed at least three feet deep into the bedrock 38. The slurry-filled trench is then backfilled with a mixture of the previously excavated soil and additional quantities of bentonite. That is, the soil-bentonite mixture is used to fill the open trench where the mixture displaces the water-bentonite slurry and hardens to form the final "slurry wall" 36. Care must be taken with this technique to ensure an even backfill and avoid the presence of any voids in the wall or the collapse of any of the untreated soil back into the trench, either of which can form "windows" of relatively high permeability within the wall. With a carefully controlled backfill, soil-bentonite slurry walls having average permeability rates on the order of $1 \times 10^{-6}$ centimeters/sec ("cm/sec") are obtainable, although permeability rates as low as $1 \times 10^{-8}$ cm/sec may also be obtained with a proper soil-bentonite mixture.

An alternative construction technique is to use a single-step excavation process where the bentonite-water slurry is mixed with concrete so that the slurry itself hardens to form a "cement-bentonite" slurry wall 36. While a cement-bentonite slurry wall is formed more quickly than the two-step (backfill) soil-bentonite slurry wall, such one-step walls typically have slightly higher permeability levels (on the order of $1 \times 10^{-5}$ cm/sec). However, the permeability of both the soil-bentonite and the cement-bentonite slurry walls may be improved by adding barriers during the trenching process and prior to forming the hardened slurry wall 36. These barriers typically comprise high density polyethylene or polyvinyl chloride sheets that are added to the slurry-filled trench either prior to the backfill step of the two-step soil-bentonite slurry wall process, or prior to the hardening of the cement-bentonite wall in the one-step cement-bentonite process. The addition of such membranes or liners further enhances the impermeable nature of the slurry walls where necessary to prevent leakage.

Thus, the use of slurry walls 36 in place of the grout walls described in the Willis patent provides a number of benefits, including substantially lower rates of water leakage or seepage and substantially reduced construction costs (depending on the depth required, soil-bentonite slurry walls can be constructed for a cost of between $2 and $10 per square foot of barrier). The above description of slurry wall construction techniques is not intended to be comprehensive as to either the different techniques or materials that may be used in the formation of slurry walls 36. Additionally, because those skilled in the art will be familiar with the different slurry wall construction techniques, no further explanation or description of exemplary slurry wall construction techniques is included herein.

Once an appropriate slurry wall 36 is formed about the perimeter of the underground reservoir 32, it may be necessary to first remove all of the "public" water found in the reservoir 32 and return it to the common water table (such as by pumping it to the river 22). This initial draining of the reservoir may be necessary to respect the water rights of neighboring land owners or of the municipality that governs the property upon which the reservoir 32 is situated. Furthermore, an initial draining of the water from the reservoir 32 permits the permeability (i.e., the degree of water-tightness) of the constructed slurry wall 36 to be accurately measured so that compliance with local seepage requirements can be verified. Toward this end, a plurality of wells 40 (FIG. 3) are preferably formed throughout the reservoir 32 to tap the water contained in the alluvial deposits of the reservoir. Each well 40 is connected by a valve 42 to a network of above-ground pipes 44 which, in turn, are connected to a common discharge point 46. A plurality of the wells 40 are required to provide adequate coverage within the reservoir 32 since the normal hydrologic currents are no longer active within the body of the reservoir 32. That is, because the water stored within the alluvial deposits of the reservoir 32 is cut off from the natural flow of groundwater through the river basin 20, the water stored within the reservoir 32 experiences a relatively low hydrodynamic pressure in comparison with the water found in aquifers outside of the reservoir boundary 34. Therefore, a plurality of wells 40 are necessary to ensure a sufficiently high flow rate and access to the entirety of the water supply within the reservoir 32. While five separate wells 40 are shown in FIG. 3, it is understood that a larger or smaller number of wells 40 may be used depending on the size of the reservoir 32 and the nature of the soil found within the reservoir (i.e., the resistance of the soil to an unimpeded flow of water).

Once the reservoir 32 is emptied of the "public" water, the same wells 40 may be used to recharge the reservoir 32 with water that is owned by the particular entity or municipality that owns the reservoir 32. The water may be directed under pressure through the pipes 44 so that the water disperses from the distal ends of the wells and into the alluvial deposits. The use of a plurality of wells 40 distributed about the area of the reservoir 32 allows for a more even filling and draining of the reservoir 32 than can be achieved by a single well. Alternatively, other un-pressurized (gravity) methods of filling the reservoir 32 may be used, such as using a series of open ponds or recharge ditches to disperse recharge water directly to the top of the alluvial reservoir 32.

An alternative to using a plurality of conventional single-point wells 40 (FIG. 3) is to employ a network or web of in-ground, perforated drainage pipes 50 (FIG. 4) that connect a series of locations within the reservoir 32 to a central, pressurized well 52. The system shown in FIG. 4 permits withdrawal and recharge of the reservoir water at a much faster rate than the gravity system of FIG. 3 due primarily to the greater surface area covered by the web of perforated pipes 50. The use of such a pressurized recharge system is particularly helpful when capturing and storing large quantities of recharge water during short periods of relatively high flow, such as during Spring runoff. Similarly, the network of perforated pipes 50 helps to ensure an adequate withdrawal rate from the reservoir 32 even during periods of relatively low water levels within the reservoir.

Figure 3:
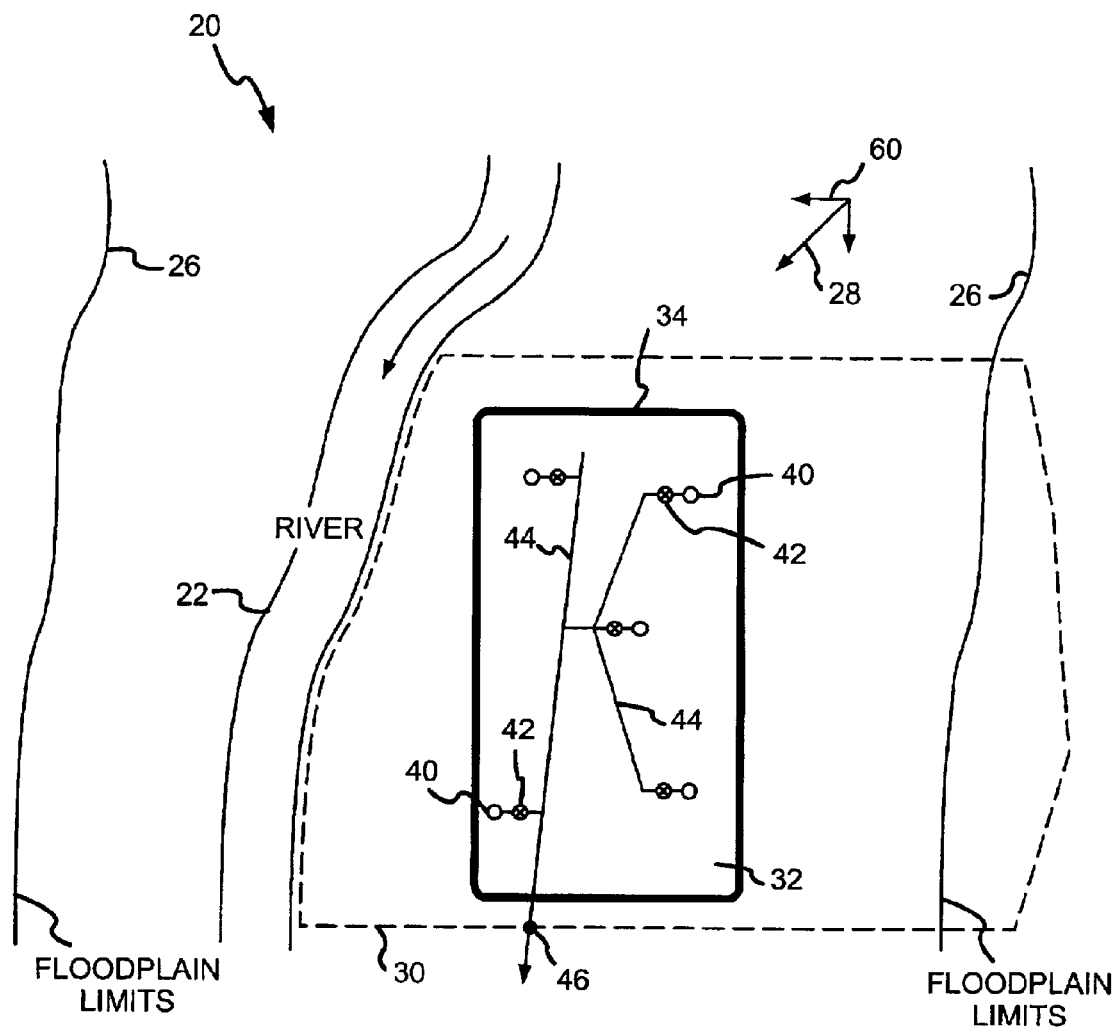
FIG. 3 is a plan view similar to FIG. 1 illustrating a network of above-ground pipes connecting a plurality of extraction/recharge wells within the perimeter of the underground water reservoir.
Figure 4:
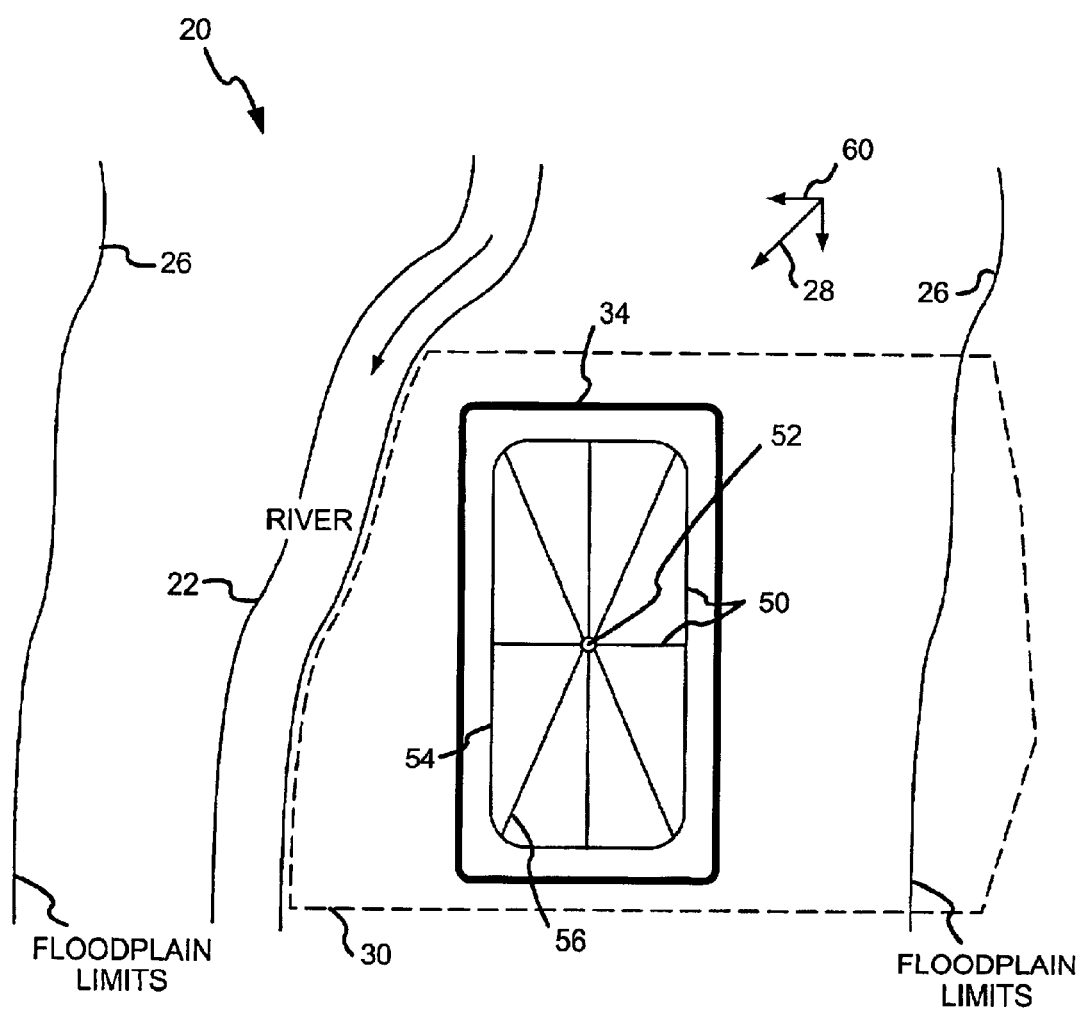
FIG. 4 is a plan view similar to FIG. 3 illustrating an alternative extraction/recharge system comprising a central well and a network of perforated pipes buried within the underground reservoir.

The extensive drainage system shown in FIG. 4 may be constructed at a time of low water level within the reservoir 32 (such as immediately after the reservoir has been completely pumped down by the system of wells 40 shown in FIG. 3), and before the reservoir is re-filled with privately owned water. Preferably, a perimeter 54 of the perforated pipe 50 is located along the reservoir boundary 34 and is connected to the central well 52 by a plurality of perforated feeder pipes 56 in a rim-and-spoke configuration. Furthermore, the perforated pipes 50 are preferably buried to a predetermined depth within the reservoir 32 using a traditional open-ditch excavating technique. In one preferred embodiment shown in FIG. 5, the perforated drainage pipe 50 is buried to the alluvial-bedrock interface of the reservoir 32 and is positioned on a bed of coarse gravel pipe bedding to increase water transmission through the pipe 50 and into the adjacent alluvial deposits. The trenches formed for the drainage pipes 50 are then preferably backfilled with a less dense, relatively permeable material 58 such as de-sanded gravel. The perforated pipes 50 are also preferably wrapped with a suitable geotextile fabric, or a combination of processed gravel and geotextile fabrics. Wrapping and supporting the perforated pipes 50 in this manner decreases the resistance and increases the flow of water through the pipe network while simultaneously reducing the likelihood that the pipes will become clogged by sediment deposits. The reduction in the amount of resistance experienced during a recharging operation allows for relatively large quantities of recharge water to be pumped into reservoir during short periods of high water flow on the river 22.

Figure 5:
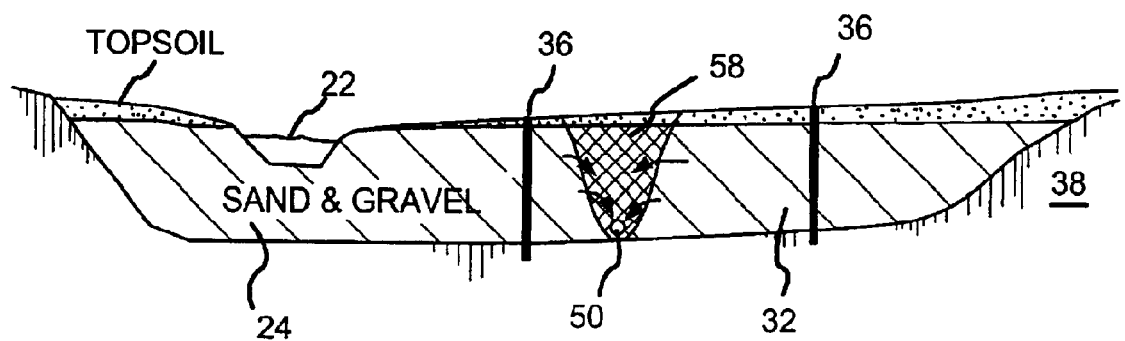
FIGS. 5 and 6 are section views of the underground reservoir similar to FIG. 2 illustrating alternative depths for the perforated pipe network shown in FIG. 4.
Figure 6:
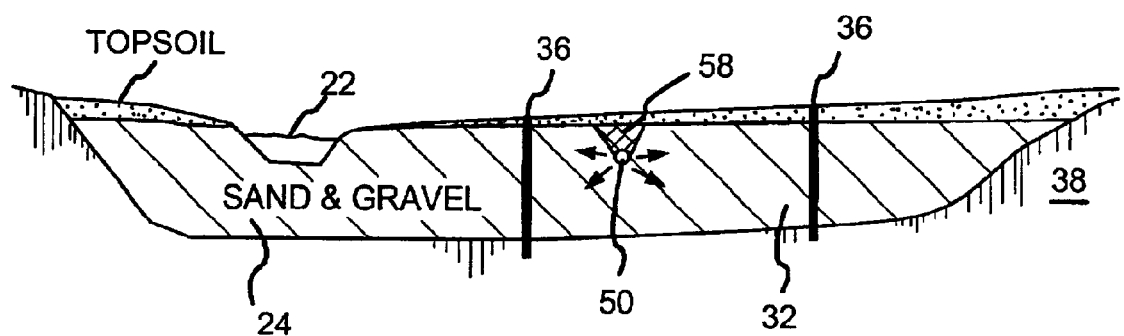

FIG. 6 illustrates an alternative (shallower) depth for the perforated pipe trenches located above a mid-level of the alluvial deposit (or even shallower at a point just below the topsoil or overburden). Such a shallower depth may be preferred where construction costs must be kept to a minimum since it is less expensive to dig shallower trenches for the pipe network. Indeed, for relatively shallow depths of less than approximately eight feet, it is possible to both form the trench and pull the perforated pipe in a single pass. Additionally, if the pipe is surrounded by the relatively coarse pipe bedding described above, it may be possible to achieve even higher pressures resulting in slightly faster recharge rates for the reservoir 32 due to the fact that the water may be dispersed in both an upward and a downward direction from the perforated pipe 50. However, positioning the pipes 50 at a relatively shallow depth exposes the pipes to a higher risk of being unintentionally severed by surface activities, or of being fouled by the roots of surface vegetation. Thus, the appropriate depth for the network of pipes 50 shown in FIG. 4 will vary with the surface use of the land. Additionally, while the relatively deep system of pipes 50 shown in FIG. 5 is more efficient at withdrawing water, the shallower system of pipes 50 shown in FIG. 6 is more efficient when it comes to rapidly recharging the reservoir 32. Thus, a selection between the two types of systems will depend on the anticipated operational requirements of the reservoir. Of course, where it is economically feasible, the two systems shown in FIGS. 5 and 6 could be combined to provide for both maximum withdrawal and recharge rates.

In addition to the above-described extraction/recharge wells 40 and 52, the reservoir 32 of the present invention also preferably includes a plurality of monitoring wells (not shown) distributed both within the interior of the reservoir and outside of the reservoir along the reservoir boundary 34. The plurality of monitoring wells can provide an area weighted average water level within the reservoir for use in determining withdrawal and recharge rates of water in the reservoir 32, as well as the overall capacity of the reservoir (in conjunction with the measured porosity of the alluvium within the reservoir 32) for accounting purposes. However, while the slurry walls 36 are substantially more impermeable to water leakage than grout walls, even soil-bentonite slurry walls 36 will permit small amounts of water seepage both into and out of the reservoir 32. Therefore, a number of "perimeter" monitoring well pairs (not shown) are preferably formed adjacent one another on opposite sides of the slurry wall 36 about the reservoir boundary 34 to help detect water seepage through the walls 36. Specifically, the pairs of monitoring wells (i.e., one well on each side of the slurry wall 36) are preferably monitored at different junctures (e.g., when the reservoir 32 is initially drawn down and subsequently fully recharged to the level of the overburden) to determine both negative seepage (i.e., when water actually leaks into the reservoir due to the outside groundwater level being higher than the water level within the reservoir) and positive seepage (i.e., when water leaks out of the reservoir due to a higher water level within the reservoir 32 than outside the reservoir) characteristics of the reservoir.

Such seepage characteristics are used in conjunction with the above-described capacity measurements for accounting purposes during operation of the reservoir 32. That is, the underground reservoir 32 will lose some quantities of water to the surrounding alluvium when the reservoir 32 is relatively full (or when the groundwater level outside the reservoir is relatively low). Alternatively, the reservoir 32 will "gain" water from the surrounding alluvium when the groundwater level outside the slurry wall 36 is higher than the water level within the reservoir 32. This phenomenon is analogous to an open reservoir that is subject to evaporative losses and climatic gains due to precipitation. Operators of such open reservoirs must make adjustments or allowances for these gains/losses when determining the amount of water that has actually been used or diverted from the reservoir, and a similar accounting system is necessary for underground reservoirs 32 due to the above-described potential for both positive and negative water seepage from the reservoir.

Figure 7:
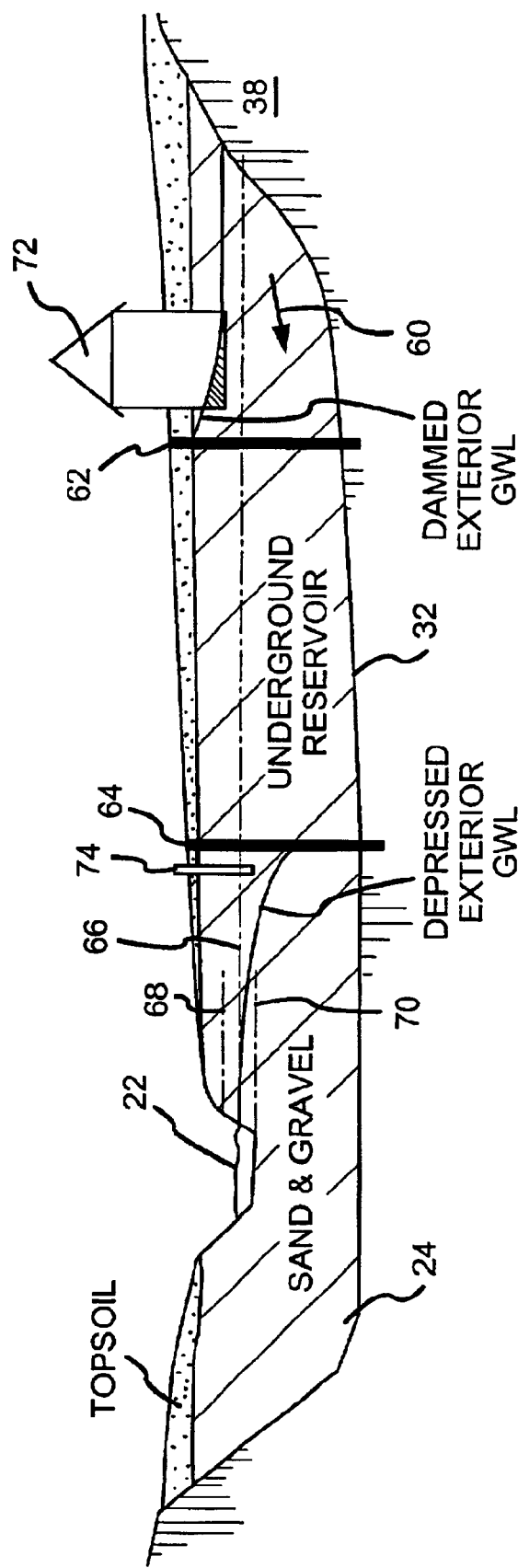
FIG. 7 is a section view of the underground reservoir similar to FIGS. 2, 5 and 6 illustrating the impact of the slurry wall boundaries of the reservoir on historic groundwater levels on both a "high" side and a "low" side of the reservoir.

While the above description details the construction of the reservoir 32 as well as the recharging and extraction of water from the reservoir 32, FIG. 7 describes the environmental impact that will typically result from the construction of the reservoir 32. Specifically, the placement of the slurry walls 36 within the river basin 20 forms a dam to the underground flow of water through the alluvial deposits 24 of the basin 20. FIG. 7 is a sectional view of the reservoir 32 and the surrounding river basin 20 and includes an arrow 60 indicating the direction of the natural alluvial flow. This arrow 60 essentially comprises one component of the flow arrow 28 shown in FIG. 1, and the direction of the arrow 60 defines an "uphill" slurry wall 62 and a "downhill" slurry wall 64 in FIG. 7.

FIG. 7 includes a first dashed line 66 that indicates a historic average groundwater level, while dashed lines 68 and 70 represent historic high and low groundwater levels, respectively. These levels may be determined prior to the construction of the reservoir 32 by first installing monitoring wells along the proposed reservoir boundary 34 to collect one or more years worth of historic groundwater elevations along the property. This information would then be used to construct an exterior groundwater mitigation system as described below.

As noted above, the construction of the substantially impermeable slurry walls 36 typically creates an underground "dam" to the alluvial groundwater flow against the uphill slurry wall 62. That is, the damming effect causes elevated levels of ground water along the uphill wall 62 which may adversely affect neighboring properties. For example, a house 72 on a neighboring parcel of land situated uphill from the "uphill" wall 62 may experience a flooded basement due to the rising water level, while neighbors on the downhill side of the reservoir 32 may experience a drying up of alluvial wells 74 when the water level drops below even the historic low water level.

Figure 8:
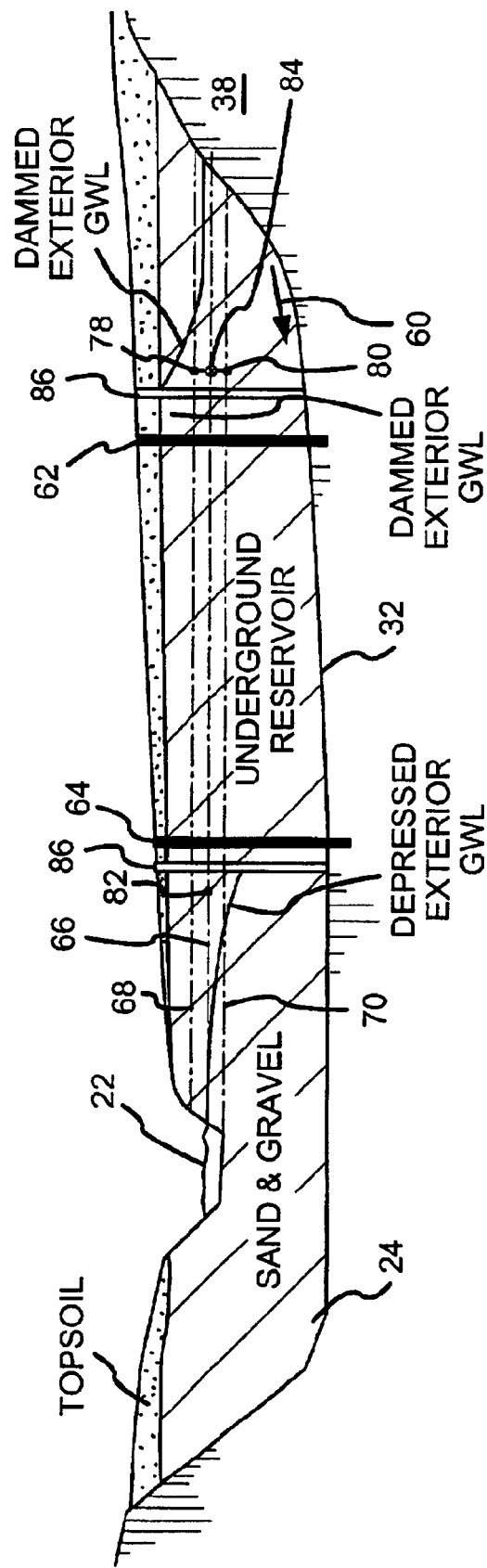
FIG. 8 is a section view of the underground reservoir similar to FIG. 7 illustrating a mitigation system for substantially maintaining the historic groundwater levels on both the "high" and "low" sides of the reservoir.

FIG. 8 illustrates a preferred mitigation system whereby a series of perforated pipes are installed outside of the reservoir 32 along both the "uphill" slurry wall 62 and the "downhill" slurry wall 64. Specifically, the uphill perforated pipes preferably include a "high level" perforated pipe 78 and a "low level" perforated pipe 80. The "high level" pipe 78 is preferably installed at the historic high groundwater level 68 as determined above, while the "low level" pipe 80 is similarly installed at the historic low water level 70. Each of these pipes 78 and 80 are preferably joined to a "downhill" perforated pipe 82 that is installed just outside of the downhill slurry wall 64 at a depth equal to the historic average water level 66. The "uphill" perforated pipes 78 and 80 are preferably joined to the "downhill" perforated pipe 82 by a non-perforated conduit (not shown) that extends along an exterior of the reservoir boundary 34. Because the "high level" uphill perforated pipe 78 is installed at a higher elevation than the downhill perforated pipe 82, the dammed water on the uphill side of the reservoir 32 is allowed to drain by gravity to the downhill perforated pipe 82. The perforated pipes 78 and 82 thus act as a passive (gravity-only) mitigation system that prevents the groundwater levels on the "uphill" side of the reservoir 32 from exceeding the historical high level 68.

While the "high level" perforated pipe 78 is always left open, the "low level" perforated pipe 80 is preferably attached to a valve 84 (FIG. 8) so that water flow through the "low level" pipe 80 to the downhill pipe 82 may be controlled as desired to mimic historic groundwater levels on the uphill side of the reservoir 32. That is, the "low level" perforated pipe 80 and the valve 84 combine to form an active mitigation system that may be used to actively draw the water level downward (when the valve 84 is opened) and back upward (when the valve 84 is closed) between the historic low and high water levels 70 and 68, respectively. Monitoring wells 86 may be placed on both the upstream and the downstream sides of the reservoir (exterior to the slurry walls 62 and 64) to monitor the groundwater levels and to control the operation of the valve 84.

The mitigation system illustrated in FIG. 8 provides for the upstream interception of dammed groundwater and the downstream recharge of the groundwater to simulate or recreate the historic average groundwater levels that existed prior to construction of the reservoir. Due to the relatively higher elevation on the uphill side of the reservoir 32, water will typically flow to the downhill discharge pipe 82 by the action of gravity and without the use of a pump. Thus, the mitigation system operates entirely passively with the exception of the valve 84 that is controlled by monitoring the wells 86. Of course, the use of the valve 84 is optional as is the use of separate "high" and "low" perforated pipes 78 and 80. Indeed, to the extent that a single, consistent groundwater level is desired (i.e., a level equal to the historic average level 66), a single perforated pipe may be installed in place of the two separate pipes 78 and 80 and the valve 84. In this manner, the mitigation system may operate in an entirely passive manner so that monitoring of the groundwater levels outside of the reservoir 32 is no longer required.

The above-described underground reservoir 32 includes a variety of improvements over prior art underground (alluvial) reservoirs such as described in U.S. Pat. No. 4,326,818 to Willis. Specifically, the use of slurry walls that are keyed into the underlying bedrock (in place of the more costly grout walls) ensures a substantially impermeable border for the reservoir 32. Additionally, the use of multiple extraction/recharge wells 40 and/or networks of perforated drainage pipes 50 allows for highly efficient access to the water within the reservoir 32 and further allows for relatively short recharge times to take maximum benefit of available water runoff from neighboring lands or from the river 22 itself. Indeed, the plurality of single-point extraction recharge wells 40 shown in FIG. 3 may be combined with the central well 52 and the network of perforated pipes 50 shown in FIG. 4 to maximize the potential extraction and recharge rates of the reservoir 32. Additionally, the mitigation system described in FIG. 8 represents the solution to a problem that was not even recognized in the Willis patent.

The presently preferred embodiment of the alluvial reservoir 32 described in FIGS. 1–8 also enjoys a number of benefits over traditional open reservoirs as described above. Specifically, the reservoir 32 is not subject to losses through evaporation and is easier to secure than open reservoirs. More importantly, the reservoir 32 can be formed in almost any location where the proper alluvial deposits exist (i.e., where the deposits have void space in the range of 20–35 percent) since the reservoir can be constructed with minimal disruption to the surface above the reservoir. Indeed, the reservoir 32 can be constructed beneath land that is already subject to various surface uses such as farms, parks, etc. The slurry walls 36 and the water extraction/recharge systems can be constructed, if necessary, without disrupting existing surface structures. Furthermore, once all the necessary excavation is complete, new structures may be built over top of the walls 36 and the underground perforated pipe network shown in FIG. 4.

Figure 9:
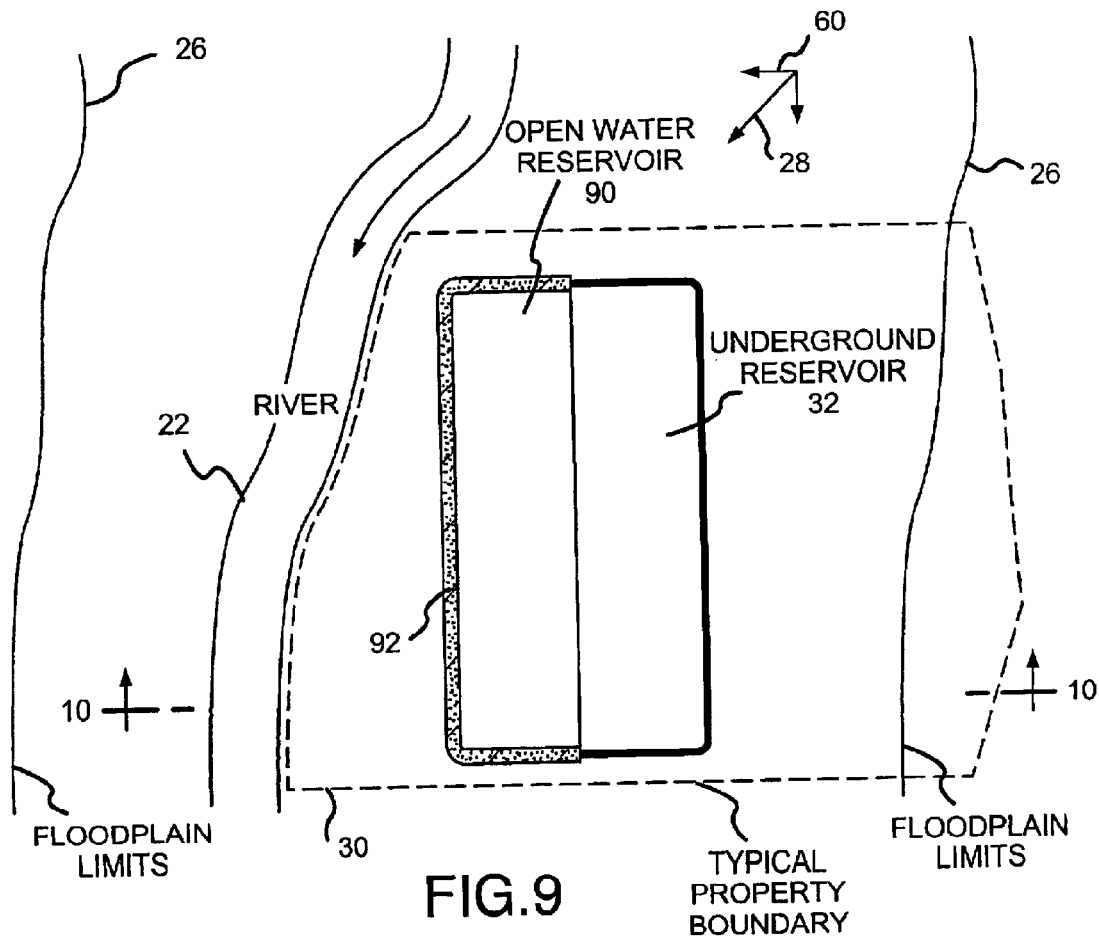
FIG. 9 is a plan view similar to FIG. 1 illustrating an alternative embodiment of a water storage reservoir where an underground reservoir similar to that shown in FIGS. 1–8 shares a border with a conventional open reservoir.
Figure 10:
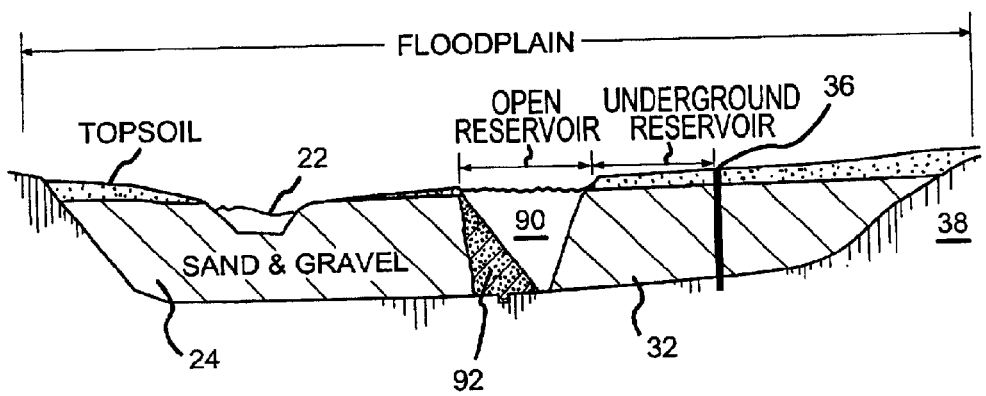
FIG. 10 is a section view taken substantially along the line 10—10 in FIG. 9.

However, it may be desirable to combine the underground, alluvial reservoir 32 with a more traditional open reservoir 90 as shown in FIGS. 9 and 10. In one embodiment, the alluvial reservoir can be built alongside an existing open reservoir provided that the open reservoir was constructed to prevent the leakage of water into the surrounding alluvial deposits. Alternatively, the open reservoir 90 may be built either simultaneously or subsequent to the construction of the alluvial reservoir 32. For example, if the alluvial reservoir 32 contains valuable mineral deposits, it may be economically viable to mine an interior portion of the reservoir 32 to extract the minerals. The mined portion could then be filled with water provided that the open reservoir remains within the boundary 34 of the alluvial reservoir 32. If the open reservoir 90 is formed simultaneously with the alluvial reservoir 32, then the border of the open reservoir opposite the alluvial reservoir 32 need only be lined (e.g., with a compacted clay liner 92) to prevent the leakage of water from the combined reservoir complex. That is, a separate slurry wall would not be required at the border of the open reservoir 90. Alternately, a slurry wall could be constructed around an existing, unlined open reservoir, forming a combined open and underground reservoir, depending on the particular circumstances.

Thus, the choice of an exclusively underground reservoir, or the combination of an underground and an open reservoir will depend on the topography (and the potential value of the mineral rights) of the particular parcel of land, as well as the volume of water required to be maintained within the reservoir. While an open reservoir 90 would be subject to evaporative losses as described above, the increased per-acre storage of water may justify the cost of the evaporative losses. That is, while an alluvial reservoir can only store a water volume up to 35 percent of the total reservoir volume, an open reservoir can fill its entire volume with water so that, even with some evaporative losses, the overall percentage of water storage increases with the combined reservoir shown in FIGS. 9 and 10. Such a combined reservoir may be appealing to a municipality that wishes to create not only a new reservoir, but also a park or open space next to a lake setting.

In sum, the underground reservoir 36 of the present invention provides a significant benefit, particularly during current times when water rights and water storage in general are of paramount importance. Specifically, land owners that do not want to give up the current or future planned surface uses of their land may opt to sell or lease only the rights to the underground alluvial sand and gravel beneath the surface. In essence, the land owner would be selling or leasing only the "empty space" found in the pores of the alluvial deposits. Furthermore, a land owner could separately retain the rights to valuable minerals that are typically found either below the alluvial sand and gravel or in small pockets or veins mixed with the alluvial deposits. As noted above, it may be possible to separately mine these valuable deposits within the boundary of the underground reservoir so that a new, open reservoir can be formed upon the conclusion of the mining operation. The present invention thus allows land owners to maximize the benefit of their land by carving out separate "surface" and "alluvial" rights and by potentially selling those rights to different parties (or selling the "alluvial rights" while maintaining possession of the surface rights).

It will be clear that the present invention is well adapted to attain the ends and advantages mentioned as well as those inherent therein. While embodiments have been described for purposes of this disclosure, various changes and modifications may be made which are well within the scope of the present invention. For example, slurry wall construction techniques and materials other than those described above may be used to form the walls 36, and all such techniques are within the scope of the present invention. Additionally, various different drain systems will be known to those skilled in the art and the present invention is not limited to the specific network of perforated pipes and wells described above. Furthermore, numerous other changes may be made which will readily suggest themselves to those skilled in the art and which are encompassed in the scope of the invention disclosed and as defined in the appended claims.

What is claimed is:

1. An underground reservoir for storing water in alluvial deposits comprising:

a slurry wall defining a closed boundary for the underground reservoir, the slurry wall extending from a surface level to an aquiclude beneath the reservoir so that a bottom surface of the slurry wall is keyed into the aquiclude to form a substantially impermeable water seal between the slurry wall and the aquiclude; and a plurality of water extraction/recharge means distributed about the underground reservoir to provide for substantially even filling and draining operations of the underground reservoir.

2. An underground reservoir as defined in claim 1 wherein the plurality of water extraction/recharge means comprises:

a plurality of wells distributed about the underground reservoir;

a plurality of pipes connecting each of the plurality of wells to a common point; and a pump to direct water under pressure through the plurality of wells and into the alluvial deposits of the underground reservoir during a recharging operation and to extract water from the alluvial deposits during an extraction operation.

3. An underground reservoir as defined in claim 2 wherein the plurality of water extraction/recharge means further comprises a series of recharge ditches and open ponds to distribute recharge water directly to a top surface of the underground reservoir.

4. An underground reservoir as defined in claim 1 wherein the plurality of water extraction/recharge means comprises:

a series of perforated pipes buried at a predetermined depth within the underground reservoir; and a central pressurized well in fluid communication with the series of perforated pipes to direct water under pressure through the perforated pipes and into the alluvial deposits during a recharging operation and to extract water from the alluvial deposits through the perforated pipes during an extraction operation.

5. An underground reservoir as defined in claim 4 wherein the series of perforated pipes includes an outer perimeter of perforated pipes connected to the central pressurized well by a series of feeder perforated pipes in a rim-and-spoke configuration.

6. An underground reservoir as defined in claim 4 wherein the series of perforated pipes is installed at a predetermined depth within the underground reservoir utilizing a trench excavation method, and wherein each perforated pipe is supported on a pipe bedding formed from materials that are more coarse than the surrounding alluvial deposits.

7. An underground reservoir as defined in claim 6 wherein the trenches formed to bury the series of perforated pipes are filled with materials that are more coarse than the excavated alluvial deposits to enhance water flow to and from the perforated pipes.

8. An underground reservoir as defined in claim 4 wherein the plurality of water extraction/recharge means further comprises:

a plurality of wells distributed about the underground reservoir;

a plurality of pipes connecting each of the plurality of wells; and a pump to direct water under pressure through the plurality of wells and into the alluvial deposits of the underground reservoir during a recharging operation and to extract water from the alluvial deposits during an extraction operation.

9. An underground reservoir as defined in claim 1 further comprising a mitigation system to reduce water table fluctuations in land parcels positioned upstream and downstream of the underground reservoir, the mitigation system comprising:

an uphill perforated pipe installed outside of the slurry wall within an upstream land parcel at a depth between a historic high and a historic low groundwater level of the upstream land parcel;

a downhill perforated pipe installed outside of the slurry wall within a downstream land parcel at a depth between a historic high and a historic low groundwater level of the downstream land parcel; and a non-perforated conduit extending outside the slurry wall and connecting the uphill perforated pipe to the downhill perforated pipe to remove excess groundwater from the upstream land parcel and transport the excess groundwater to the downstream land parcel.

10. An underground reservoir as defined in claim 9 wherein:

the uphill perforated pipe is installed at a depth substantially equal to the historic high groundwater level of the upstream land parcel; and the downhill perforated pipe is installed at a depth substantially equal to a historic average groundwater level of the downstream land parcel.

11. An underground reservoir as defined in claim 10 further comprising:

a second uphill perforated pipe installed at a depth substantially equal to the historic low groundwater level of the upstream land parcel, the second uphill perforated pipe in fluid communication with the downhill perforated pipe; and a valve controlling water flow from the second uphill perforated pipe to the downhill perforated pipe, whereby selective activation of the valve alters a groundwater level of the upstream land parcel between the historic high and the historic low groundwater levels.

12. An underground reservoir as defined in claim 1 further comprising an open reservoir formed within the closed boundary of the slurry wall.

13. An underground reservoir as defined in claim 1 wherein:

the slurry wall defines an open boundary along one side of the underground reservoir; and the open boundary of the underground reservoir abuts an open reservoir to permit an exchange of water between the open reservoir and the underground reservoir.

14. A method for storing water in underground alluvial deposits comprising the steps of:

constructing an underground slurry wall defining a closed boundary around the underground alluvial deposits, the slurry wall extending from a surface level to an aquiclude beneath the alluvial deposits so that a bottom surface of the slurry wall is keyed into the aquiclude to form a substantially impermeable water seal between the slurry wall and the aquiclude; and alternately extracting and recharging the underground alluvial deposits with water.

15. The method according to claim 14 wherein the step of alternately extracting and recharging the alluvial deposits with water includes the steps of:

constructing a plurality of wells distributed about an interior area of the slurry wall;

pumping water under pressure through the plurality of wells and into the alluvial deposits; and extracting water from the alluvial deposits through the plurality of wells.

16. The method according to claim 14 wherein the step of alternately extracting and recharging the alluvial deposits with water includes the steps of:

burying a series of perforated pipes at a predetermined depth within the alluvial deposits;

constructing a central well in fluid communication with the series of perforated pipes;

pumping water under pressure through the central well and the series of perforated pipes and into the alluvial deposits; and extracting water from the alluvial deposits through the series of perforated pipes and the central well.

17. The method according to claim 16 wherein the step of burying a series of perforated pipes at a predetermined depth within the alluvial deposits includes the steps of:

excavating an open trench;

supporting the perforated pipes within the open trench on a pipe bedding formed from materials that are more coarse than the surrounding alluvial deposits; and filling the open trench with materials that are more coarse than the excavated alluvial deposits to enhance water flow to and from the perforated pipes.

18. The method according to claim 14 further comprising the steps of:

burying an uphill perforated pipe outside of the closed boundary of the underground slurry wall within an upstream land parcel at a depth between a historic high and a historic low groundwater level of the upstream land parcel;

burying a downhill perforated pipe outside of the closed boundary of the underground slurry wall within a downstream land parcel at a depth between a historic high and a historic low groundwater level of the downstream land parcel; and connecting a non-perforated conduit between the uphill perforated pipe and the downhill perforated pipe to remove excess groundwater from the upstream land parcel and transport the excess groundwater to the downstream land parcel to mitigate water table fluctuations resulting from the construction of the underground slurry wall.

19. A method of mitigating water table fluctuations resulting from the construction of an underground alluvial reservoir comprising the steps of:

burying an uphill perforated pipe outside of a boundary of the underground reservoir within an upstream land parcel at a depth between a historic high and a historic low groundwater level of the upstream land parcel;

burying a downhill perforated pipe outside of the boundary of the underground reservoir within a downstream land parcel at a depth between a historic high and a historic low groundwater level of the downstream land parcel; and connecting a non-perforated conduit between the uphill perforated pipe and the downhill perforated pipe to remove excess groundwater from the upstream land parcel and transport the excess groundwater to the downstream land parcel.

20. The method according to claim 19 wherein:

the uphill perforated pipe is buried at a depth substantially equal to the historic high groundwater level of the upstream land parcel; and the downhill perforated pipe is buried at a depth substantially equal to a historic average groundwater level of the downstream land parcel.

21. The method according to claim 20 further comprising the steps of:

burying a second uphill perforated pipe outside of the boundary of the underground reservoir at a depth substantially equal to the historic low groundwater level of the upstream land parcel;

fluidly connecting the second uphill perforated pipe with the downhill perforated pipe; and positioning a valve between the second uphill perforated pipe and the downhill perforated pipe and selectively activating the valve to alter a groundwater level of the upstream land parcel between the historic high and the historic low groundwater levels.

* * * * *

US006840710C1

(12) EX PARTE REEXAMINATION CERTIFICATE (8883rd)

United States Patent
Peters et al.

(10) Number: US 6,840,710 C1
(45) Certificate Issued: Mar. 6, 2012

(54) UNDERGROUND ALLUVIAL WATER STORAGE RESERVOIR AND METHOD

(75) Inventors: Stanley R. Peters, Castle Rock, CO (US); Randall R. Beeson, Arvada, CO (US); Donald O. Summers, Lakewood, CO (US)

(73) Assignee: RAR Group, LLC, Lakewood, CO (US)

Reexamination Request:
No. 90/009,713, Mar. 31, 2010

Reexamination Certificate for:
Patent No.: 6,840,710
Issued: Jan. 11, 2005
Appl. No.: 10/147,184
Filed: May 15, 2002

Related U.S. Application Data

(60) Provisional application No. 60/373,887, filed on Apr. 19, 2002, and provisional application No. 60/290,785, filed on May 15, 2001.

(51) Int. Cl.
*B65G 5/00* (2006.01)

(52) U.S. Cl. .................. 405/57; 405/267; 405/270

(58) Field of Classification Search .................... 405/53
See application file for complete search history.

(56) References Cited

To view the complete listing of prior art documents cited during the proceeding for Reexamination Control Number 90/009,713, please refer to the USPTO's public Patent Application Information Retrieval (PAIR) system under the Display References tab.

*Primary Examiner* — Jeffrey L. Gellner

(57) ABSTRACT

An underground reservoir for storing water in alluvial deposits utilizes slurry walls keyed to an aquiclude beneath the reservoir to form a substantially impermeable water seal. A variety of water extraction/recharge apparatus provides for rapid and complete filling and draining of the underground reservoir. Such apparatus includes a plurality of wells distributed about the underground reservoir and a series of perforated pipes buried at a predetermined depth within the underground reservoir. A method of mitigating water table fluctuations resulting from the construction of an underground utilizes perforated pipes buried outside of the reservoir to transfer excess water from an uphill land parcel to a downhill land parcel that would otherwise experience a water shortage after construction of the underground reservoir.

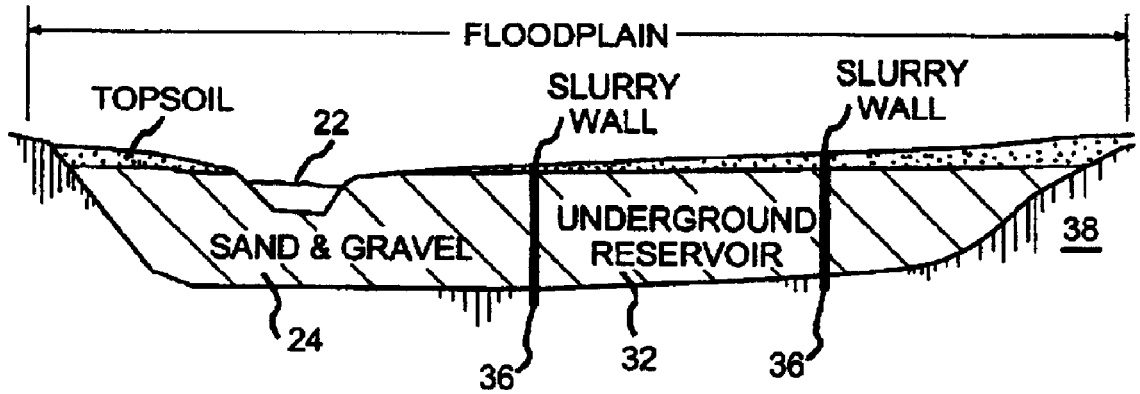

US 6,840,710 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4-9 and 13-18 are determined to be patentable as amended.

Claims 3 and 10-12, dependent on an amended claim, are determined to be patentable.

Claims 19-21 were not reexamined.

New claims 22-33 are added and determined to be patentable.

1. An underground reservoir for storing water in alluvial deposits comprising:
    a slurry wall defining a closed boundary for the underground reservoir, the slurry wall [extending] *comprising an open trench excavated* from a surface level to an aquiclude beneath the reservoir so that [a bottom surface of the slurry wall] *the open trench* is keyed into the aquiclude [to], *wherein the open trench is filled with a liquid slurry that hardens within the open trench to form the slurry wall so that a bottom surface of the slurry wall within the keyed portion of the open trench* [form] *forms* a substantially impermeable water seal [between the slurry wall and] *with* the aquiclude, *and wherein the alluvial deposits within the closed boundary of the underground reservoir are suitable for storing water for beneficial use*; and
    a plurality of water extraction/recharge means distributed about the underground reservoir to provide for substantially even filling and draining operations of the underground reservoir *with beneficial use water*.

2. An underground reservoir as defined in claim 1 wherein the plurality of water extraction/recharge means comprises:
    a plurality of wells distributed about the underground reservoir;
    a plurality of pipes connecting each of the plurality of wells to a common point; and
    a pump to direct *beneficial use* water under pressure through the plurality of wells and into the alluvial deposits of the underground reservoir during a recharging operation and to extract *beneficial use* water from the alluvial deposits during an extraction operation.

4. An underground reservoir as defined in claim 1 wherein the plurality of water extraction/recharge means comprises:
    a series of perforated pipes buried at a predetermined depth within the underground reservoir; and
    a central pressurized well in fluid communication with the series of perforated pipes to direct *beneficial use* water [under pressure] through the perforated pipes and into the alluvial deposits during a recharging operaton and to extract *beneficial use* water from the alluvial deposits through the perforated pipes during an extraction operation.

5. An underground reservoir [as defined in claim 4 wherein] *for storing water in alluvial deposits comprising:*
    *a slurry wall defining a closed boundary for the underground reservoir, the slurry wall extending from a surface level to an aquiclude beneath the reservoir so that a bottom surface of the slurry wall is keyed into the aquiclude to form a substantially impermeable water seal between the slurry wall and the aquiclude; and*
    *a plurality of water extraction/recharge means distributed about the underground reservoir to provide for substantially even filling and draining operations of the underground reservoir;*
    *wherein the plurality of water extraction/recharge means comprises:*
        a series of perforated pipes buried at a predetermined depth within the underground reservoir, the series of perforated pipes [includes] *including* an outer perimeter of perforated pipes connected to the central pressurized well by a series of feeder perforated pipes in a rim-and-spoke configuration; *and*
        *a central pressurized well in fluid communication with the series of perforated pipes to direct water under pressure through the perforated pipes and into the alluvial deposits during a recharging operation and to extract water from the alluvial deposits through the perforated pipes during an extraction operation.*

6. An underground reservoir as defined in claim 4 wherein the series of perforated pipes is installed at a predetermined depth within the underground reservoir utilizing [a] *an open* trench excavation method, and wherein each perforated pipe is supported on a pipe bedding formed from materials that are more coarse than the surrounding alluvial deposits.

7. An underground reservoir as defined in claim 6 wherein the *open* trenches formed to bury the series of perforated pipes are filled with materials that are more coarse than the excavated alluvial deposits to enchance water flow to and from the perforated pipes.

8. An underground reservoir as defined in claim 4 wherein the plurality of water extraction/recharge means further comprises:
    a plurality of wells distributed about the underground reservoir;
    a plurality of pipes connecting each of the plurality of wells; and
    a pump to direct *beneficial use* water under pressure through the plurality of wells and into the alluvial deposits of the underground reservoir during a recharging operation and to extract *beneficial use* water from the alluvial deposits during an extraction operation.

9. An underground reservoir [as defined in claim 1 further comprising] *for storing water in alluvial deposits comprising:*
    *a slurry wall defining a closed boundary for the underground reservoir, the slurry wall extending from a surface level to an aquiclude beneath the reservoir so that a bottom surface of the slurry wall is keyed into the aquiclude to form a substantially impermeable water seal between the slurry wall and the aquiclude;*
    *a plurality of water extraction/recharge means distributed about the underground reservoir to provide for substantially even filling and draining operations of the underground reservoir; and*
    a mitigation system to reduce water table fluctuations in land parcels positioned upstream and downstream of the underground reservoir, the mitigation system comprising:

an uphill perforated pipe installed outside of the slurry wall within an upstream land parcel at a depth between a historic high and a historic low groundwater level of the upstream land parcel;

a downhill perforated pipe installed outside of the slurry wall within a downstream land parcel at a depth between a historic high and a historic low groundwater level of the downstream land parcel; and a non-perforated conduit extending outside the slurry wall and connecting the uphill perforated pipe to the downhill perforated pipe to remove excess groundwater from the upstream land parcel and transport the excess groundwater to the downstream land parcel.

13. An underground reservoir [as defined in claim 1 wherein:] *for storing water in alluvial deposits comprising:* a slurry wall defining a boundary for the underground reservoir, the slurry wall extending from a surface level to an aquiclude beneath the reservoir so that a bottom surface of the slurry wall is keyed into the aquiclude to form a substantially impermeable water seal between the slurry wall and the aquiclude, wherein the slurry wall defines an open boundary along one side of the underground reservoir; and a plurality of water extraction/recharge means distributed about the underground reservoir to provide for substantially even filling and draining operations of the underground reservoir;

wherein the open boundary of the underground reservoir abuts an open reservoir to permit an exchange of water between the open reservoir and the underground reservoir.

14. A method for storing water in underground alluvial deposits comprising the steps of:

constructing an underground slurry wall defining a closed boundary around the underground alluvial deposits, the slurry wall [extending] *comprising an open trench excavated* from a surface level to an aquiclude beneath the alluvial deposits so that [a bottom surface of the slurry wall] *the open trench* is keyed into the aquiclude [to form], *wherein the open trench is filled with a liquid slurry that hardens within the open trench to form the slurry wall so that a bottom surface of the slurry wall within the keyed portion of the open trench forms* a substantially impermeable water seal [between the slurry wall and] *with* the aquiclude[and]*, and wherein the alluvial deposits within the closed boundary are suitable for storing water for beneficial use*;

alternately extracting and recharging the underground alluvial deposits with *beneficial use* water; *and monitoring an average level of beneficial use water stored within the alluvial deposits*.

15. The method according to claim 14 [wherein the step of alternately extracting and recharging the alluvial deposits with water includes the steps]*, further comprising the step* of:

constructing a pluraltiy of wells distributed about an interior area of the slurry [wall;

pumping water under pressure through the plurality of wells and into the alluvial deposits; and extracting water from the alluvial deposits through the plurality of wells] *wall, wherein the stored beneficial use water is extracted from the alluvial deposits through the plurality of wells*.

16. The method according to claim 14 [wherein the step of alternately extracting and recharging the alluvial deposits with water incudes]*further comprising* the steps of:

burying a series of perforated pipes at a predetermined depth wthin the alluvial deposits; *and* constructing a central well in fluid communication with the series of perforated pipes;

[pumping water under pressure through the central well and the series of perforated pipes and into the Alluvial deposits; and extracting] *wherein the stored beneficial use* water *is extracted* from the alluvial deposits through the series of perforated pipes and the central well.

17. [The method according to claim 16] *A method for storing water in underground alluvial deposits comprising the steps of:* constructing an underground slurry wall defining a closed boundary around the underground alluvial deposits, the slurry wall extending from a surface level to an aquiclude beneath the alluvial deposits so that a bottom surface of the slurry wall is keyed into the aquiclude to form a substantially impermeable water seal between the slurry wall and the aquiclude; and alternately extracting and recharging the underground alluvial deposits with water;

wherein the step of alternately extracting and recharging the alluvial deposits with water includes the steps of:

burying a series of perforated pipes at a predetermined depth within the alluvial deposits;

constructing a central well in fluid communication with the series of perforated pipes;

pumping water under pressure through the central well and the series of perforated pipes and into the alluvial deposits; and extracting water from the alluvial deposits through the series of perforated pipes and the central well; and wherein the step of burying a series of perforated pipes at a predetermined depth within the alluvial deposits includes the steps of:

excavating an open trench;

supporting the perforated pipes within the open trench on a pipe bedding formed from materials that are more coarse than the surrounding alluvial deposits; and filling the open trench with materials that are more coarse than the excavated alluvial deposits to enhance water flow to and from the perforated pipes.

18. [The method according to claim 14 further] *A method for storing water in underground alluvial deposits* comprising the steps of:

constructing an underground slurry wall defining a closed boundary around the underground alluvial deposits, the slurry wall extending from a surface level to an aquiclude beneath the alluvial deposits so that a bottom surface of the slurry wall is keyed into the aquiclude to form a substantially impermeable water seal between the slurry wall and the aquiclude;

alternately extracting and recharging the underground alluvial deposits with water;

burying an uphill perforated pipe outside of the closed boundary of the underground slurry wall within an upstream land parcel at a depth between a historic high and a historic low groundwater level of the upsteram land parcel;

burying a downhill perforated pipe outside of the closed boundary of the underground slurry wall within a downstream land parcel at a depth between a historic high and a historic low groundwater level of the downstream land parcel; and connecting a non-perforated conduit between the uphill perforated pipe and the downhill perforated pipe to remove excess groundwater from the upstream land parcel and transport the excess groundwater to the downhill land parcel to mitigate water table fluctuations resulting from the construction of the underground slurry wall.

22. An underground reservoir as defined in claim 1, wherein the plurality of water extraction/recharge means are further used to remove substantially all public water initially contained within the alluvial deposits of the underground reservoir.

23. An underground reservoir as defined in claim 1, further comprising:
   a plurality of monitoring wells within the reservoir to provide an average level of beneficial use water within the reservoir.

24. An underground reservoir as defined in claim 23, wherein the plurality of monitoring wells further provide recharge and withdrawal rates of beneficial use water within the reservoir.

25. The method according to claim 14, further comprising the step of:
   removing substantially all public water initially contained within the alluvial deposits of the closed boundary.

26. The method according to claim 15, wherein the alluvial deposits are charged with beneficial use water that is pumped through the plurality of wells.

27. The method according to claim 16, wherein the alluvial deposits are charged with beneficial use water that is pumped through the central well and the series of perforated pipes.

28. A method for storing water in an underground reservoir comprising the steps of:
   constructing an underground slurry wall around alluvial deposits that are suitable to store water for beneficial use, the slurry wall comprising an open trench excavated from a surface level to an aquiclude beneath the alluvial deposits so that the open trench is keyed into the aquiclude, wherein the open trench is filled with a liquid slurry that hardens within the open trench to form the slurry wall so that a bottom surface of the slurry wall within the keyed portion of the open trench forms a substantially impermeable water seal with the aquiclude, wherein the slurry wall and the aquiclude define a boundary of the underground reservoir which initially contains a volume of public water stored within the alluvial deposits;
   removing substantially all of the public water from the underground reservoir;
   recharging the alluvial deposits with beneficial use water in order to store the beneficial use water in the underground reservoir; and
   extracting the stored beneficial use water from the alluvial deposits of the underground reservoir as needed.

29. The method according to claim 28, further comprising the step of:
   measuring an overall capacity of the underground reservoir for storing beneficial use water.

30. The method according to claim 28, further comprising the step of:
   monitoring an average level of beneficial use water stored within the underground reservoir.

31. The method according to claim 30, further comprising the step of:
   monitoring recharge and withdrawal rates of beneficial use water within the underground reservoir.

32. The method according to claim 30, further comprising the steps of:
   monitoring a water level outside of the underground reservoir; and
   determining at least one of a negative or positive seepage characteristic of the underground reservoir based on a difference between the monitored average level of beneficial use water stored within the underground reservoir and the monitored water level outside of the underground reservoir.

33. The method according to claim 32, further comprising the steps of:
   measuring an overall capacity of the underground reservoir for storing beneficial use water; and
   determining an available capacity of the underground reservoir by adjusting the measured capacity to account for the negative or positive seepage characteristics of the underground reservoir.

* * * * *